United States Patent
Wu

(10) Patent No.: US 10,575,073 B2
(45) Date of Patent: *Feb. 25, 2020

(54) METHOD AND APPARATUS FOR UNIFYING AN EPON ACCESS NETWORK AND A COAX-BASED ACCESS NETWORK

(71) Applicant: Entropic Communications, LLC, Carlsbad, CA (US)

(72) Inventor: Zong Wu, Carlsbad, CA (US)

(73) Assignee: Entropic Communications, LLC, Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/237,410

(22) Filed: Dec. 31, 2018

(65) Prior Publication Data

US 2019/0141422 A1    May 9, 2019

Related U.S. Application Data

(63) Continuation of application No. 15/881,000, filed on Jan. 26, 2018, now Pat. No. 10,182,274, which is a
(Continued)

(51) Int. Cl.
*H04B 10/27* (2013.01)
*H04Q 11/00* (2006.01)
*H04L 12/28* (2006.01)

(52) U.S. Cl.
CPC ....... *H04Q 11/0003* (2013.01); *H04B 10/271* (2013.01); *H04L 12/2801* (2013.01);
(Continued)

(58) Field of Classification Search
CPC .................................................. H04B 10/271
See application file for complete search history.

(56) References Cited

U.S. PATENT DOCUMENTS 9,883,260 B2    1/2018  Zong
2002/0146026 A1* 10/2002 Unitt ............... H04L 12/1886
370/428
(Continued)

FOREIGN PATENT DOCUMENTS

EP    2509259 A1    10/2012
EP    2885895 A1    6/2015

OTHER PUBLICATIONS

Extended European Search Report dated Dec. 22, 2015 for European Patent Application No. 13757672.4.
(Continued)

*Primary Examiner* — Nathan M Cors
(74) *Attorney, Agent, or Firm* — McAndrews, Held & Malloy

(57) ABSTRACT

Methods and systems for unifying an EPON network and a coax-based access network may include, in a network with an Ethernet passive optical network (EPON) optical line terminal (OLT), coaxial network units (CNUs), and an optical coax bridge (OCB) with a plurality of virtual optical network units (vONUs) each comprising a plurality of logical link identifiers (LLIDs) and having its own MAC address, each vONU corresponding to one CNU: forming, in the OCB, each of the plurality of vONUs when a respective CNU is admitted to a coax network coupled to the OCB; communicating data transmissions from an optical fiber network to the coax network, and data transmissions from the coax network to the optical fiber network, via said OCB; and transmitting and receiving data packets between the OLT and the at least one CNU. The OCB may emulate an optical network unit (ONU) relative to the OLT.

17 Claims, 4 Drawing Sheets

Related U.S. Application Data continuation of application No. 14/383,623, filed as application No. PCT/US2013/029923 on Mar. 8, 2013, now Pat. No. 9,883,260.

(60) Provisional application No. 61/608,632, filed on Mar. 8, 2012.

(52) U.S. Cl.
CPC ...... *H04L 12/2861* (2013.01); *H04L 12/2885* (2013.01); *H04L 12/2898* (2013.01); *H04Q 11/0062* (2013.01); *H04Q 11/0067* (2013.01); *H04Q 11/0071* (2013.01); *H04Q 2011/0088* (2013.01)

(56) References Cited

U.S. PATENT DOCUMENTS

| | | |
|---|---|---|
| 2005/0047782 A1 | 3/2005 | Davis |
| 2005/0058118 A1 | 3/2005 | Davis et al. |
| 2006/0039390 A1 | 2/2006 | Boyd et al. |
| 2006/0182132 A1 | 8/2006 | Kim et al. |
| 2010/0124420 A1 | 5/2010 | Shiota |
| 2010/0239252 A1* | 9/2010 | Davis ................ H04L 12/2885 398/58 |
| 2011/0058813 A1 | 3/2011 | Boyd |
| 2012/0257893 A1* | 10/2012 | Boyd ................ H04L 12/2801 398/58 |
| 2013/0202286 A1 | 8/2013 | Boyd |
| 2013/0202293 A1 | 8/2013 | Boyd |
| 2013/0202304 A1 | 8/2013 | Boyd |
| 2013/0232537 A1 | 9/2013 | Montojo |
| 2013/0236178 A1 | 9/2013 | Garavaglia |
| 2013/0236185 A1 | 9/2013 | Fang |
| 2013/0239165 A1 | 9/2013 | Garavaglia |
| 2014/0137177 A1* | 5/2014 | Rakib .............. H04B 10/25751 725/129 |
| 2014/0140698 A1 | 5/2014 | Hajduczenia |

OTHER PUBLICATIONS

International Search Report and Written Opinion for application PCT/US2013/029923, dated Jul. 10, 2013.

\* cited by examiner

METHOD AND APPARATUS FOR UNIFYING AN EPON ACCESS NETWORK AND A COAX-BASED ACCESS NETWORK

CROSS-REFERENCE TO RELATED APPLICATIONS

This application is a continuation of Ser. No. 15/881,000 filed on Jan. 26, 2018, which is a continuation of application Ser. No. 14/383,623 filed on Sep. 8, 2014, which is the National Stage Entry of PCT Application PCT/US2013/029923, which claims the benefit of U.S. Provisional Application No. 61/608,632, filed Mar. 8, 2012, the specification of which is incorporated by reference.

FIELD

This disclosure is related to a communication network and more particularly to bridging Ethernet passive optical networks with coax based access networks.

BACKGROUND INFORMATION

There are two different types of access networks for packet data transmission. These are shown in FIGS. 1 and 2. FIG. 1 shows a typical Ethernet passive optical network (EPON) consisting of an optical line terminal (OLT) 10 at the headend side of the system. A typical OLT has medium access logic 12 connected to transmitter (Tx) 14 and receiver (Rx) 16 that is connected to wavelength division multiplexer (WDM) 18. The data packets are sent and received through optical fiber 20. Optical fiber 20 is connected to 1:N optical splitter 22 which is dispersed to a plurality of optical network units (ONUs) 24 on the customer premises side.

A second type of access network is shown in FIG. 2. This is a coaxial cable-based access network. In this system access network controller 26 at the headend side, is linked by coaxial cable 28 to a plurality of coax networks units (CNUs) 30 at the customer premises side.

SUMMARY

The embodiments disclosed herein are for a multi-system operator (MSO) to deploy a standard OLT and install ONUs so the MSO can connect ONUs to the OLT to via an optical fiber. For users that do not have access to an optical fiber, the MSO deploys a converter between the optical fiber and a coax network so that the MSO can use the standard OLT to communicate with CNUs.

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope or applicability of the claimed invention. It should be noted that for clarity and ease of illustration, these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The presently claimed invention solves the problem of the ability of using a standard OLT to communicate with both ONUs and CNUs without the OLT having to distinguish the difference between the network units.

Disclosed is a MSO deploying a standard OLT, and installed with ONUs to be used by customers to whom the MSO can connect using optical fiber. For customers that cannot be reached with optical fiber, the MSO deploys a converter between the optical fiber and the coax cable network so that the MSO can use the same standard OLT, and use CNUs for those customers attached to the coax cable network.

Figure 3:
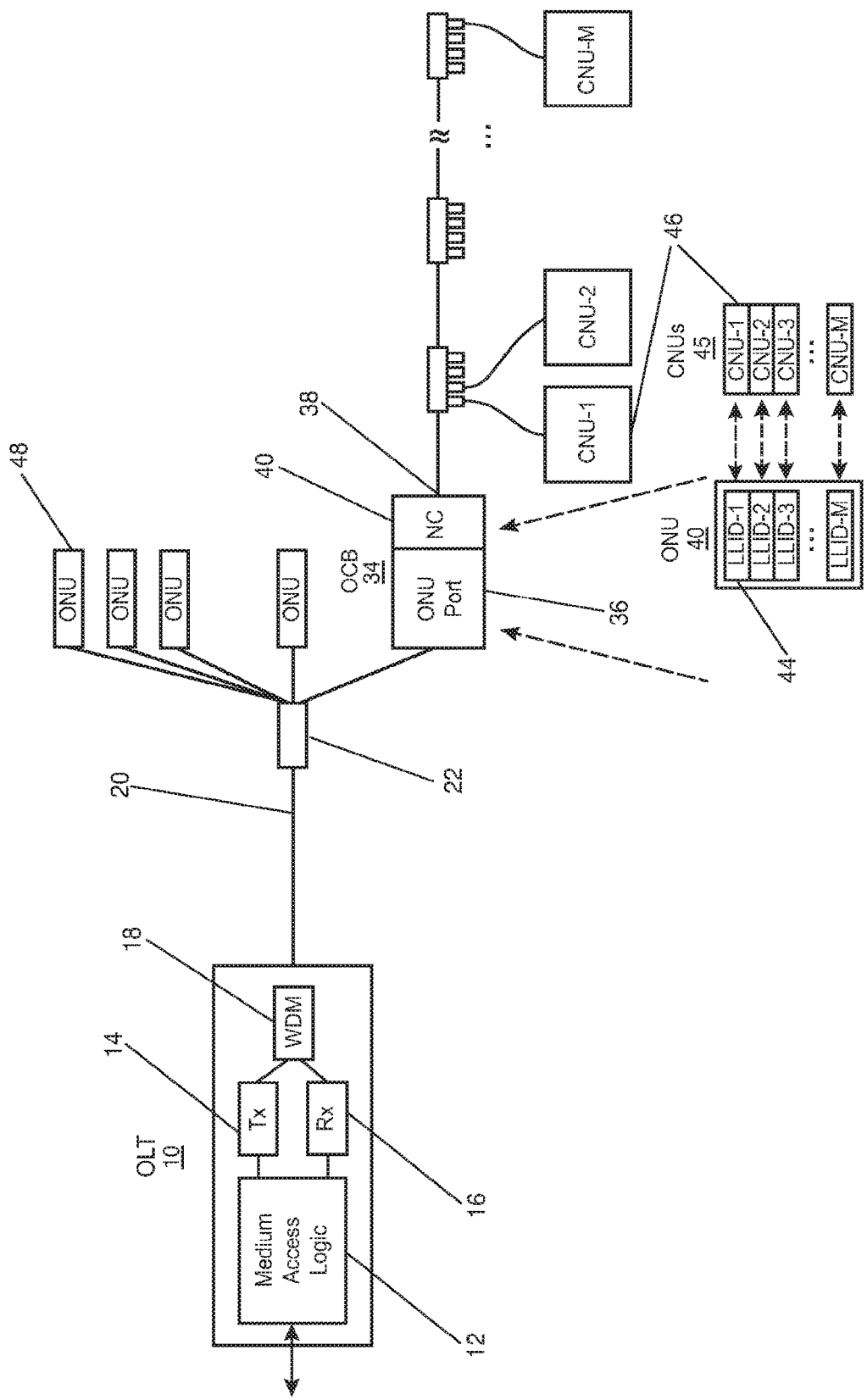
FIG. 3 illustrates an embodiment of the disclosed method and apparatus in which the same OLT is used for both customers that are reachable through optical fiber, and those that are not reachable through optical fiber, but are reachable through coaxial cable.

FIG. 3 shows one embodiment whereby the same OLT 10 is used for both types of customers, those who are reachable through optical fiber, and those who are not reachable through optical fiber, but are reachable through coaxial cable, such as Entropic Communications' c.Link access network, via a pass-through device that passes data between the OLT 10 and at least one CNU. This pass-through device preferably is flexible in several ways, such as allowing the MSO to use different portions of the RF spectrum, including more or less spectrum as available. Additionally, for the OLT, the behavior of a CNU must be functionally equivalent or emulates an ONU so that the OLT does not know the difference. This is achieved by the pass-through device that translates the behaviors of the CNUs into that of one or plural ONUs relative to the OLT, and translates the behaviors of the OLT into that of the coax network's network coordinator. Further, for interoperability between different vendors, it is desirable for a standard to exist that governs how this pass-through device and the CNUs work.

A standard EPON access network is connected to a coaxial cable access network through optical fiber 20 to coax bridge, such as optical-fiber-to-coax bridge (OCB) 34. In this embodiment, OLT 10 is preferably a standard EPON OLT. This embodiment is used when there are two types of devices at customer premises, a first type is a standard EPON ONU, used for customers who can be reached by optical fiber, and the second type is a coaxial cable-based access CNU, which includes c.LINK access CPE, DOCSIS Cable Modem CPE, WiFi Station, and the like. First, an optical splitter 22 provides access to each of the plurality of ONUs 48 which operate in the normal fashion. Optical splitter 22 also provides access to at least one OCB 34. Optical-fiber-to-coax bridge or OCB 34 device preferably has an ONU port 36 and coax port 38. A network coordinator (NC) 40 of the coaxial cable access network (or equivalently the CMTS of the DOCSIS network, or Access Point of the WiFi network), manages the regular operation of the coaxial cable access network, like node admission, TDMA scheduling, etc. Relative to the standard OLT, OCB 34 behaves as a standard ONU 40, with multiple LLIDs 44. For each CNU 46 (i.e. a cable CPE), OCB 34 creates a set of LLIDs 44. There can be one or more LLIDs in a set. Thus, the OCB's ONU port 36 has M sets of LLIDs 44, which represents M CNUs 45. For example, a coaxial access network with M CNUs 45, OCB 34 will thus create M sets of LLIDs 44.

For downstream traffic from OLT 10, OCB 34 receives all the packets, but will discard those packets whose LLIDs 44 and destination MAC address do not belong to this OCB 34, and will store the packets that are destined to this OCB 34 and/or the CNUs 46. Concurrently, OCB 34 schedules and transmits downstream packets to CNUs 46, following the protocol of the coaxial cable access network, like c.LINK.

For upstream traffic from CNUs 46 to OCB 34, the OCB schedules them and receives them, following the protocol of the coaxial cable access network, like c.LINK. Concurrently, OCB 34 uses REPORT messages to request EPON bandwidth for individual LLIDs 44 and queues to OLT 10, and the OLT uses GATE messages to grant time slots for individual LLIDs 44 and queues. Upon receiving GATE messages, OCB 34 transmits packets for appropriate LLIDs 44 and queues. For EPON admission/registration, OCB 34 will register the OCB's ONU port 36 as if it is a standard ONU 48, with all the LLIDs 44 needed to support all the CNUs 46 of the coaxial cable access network.

For network provisioning and management, data over cable service interface specification (DOCSIS) provisioning of EPON (DPoE) can be used directly. OLT 10 considers the ONU port 36 of OCB 34 as if it is a standard ONU 48. For whatever operations that OLT 10 performs, the logic ONU and the OCB 34 will translate them into corresponding operations in the coaxial cable access network, and report back results when appropriate. In this respect, logically ONU port 36 is considered as the DPoE API of a standard ONU 48, and the coaxial cable network operations is considered as the actual execution of the DPoE operations inside a standard ONU device.

Figure 1:
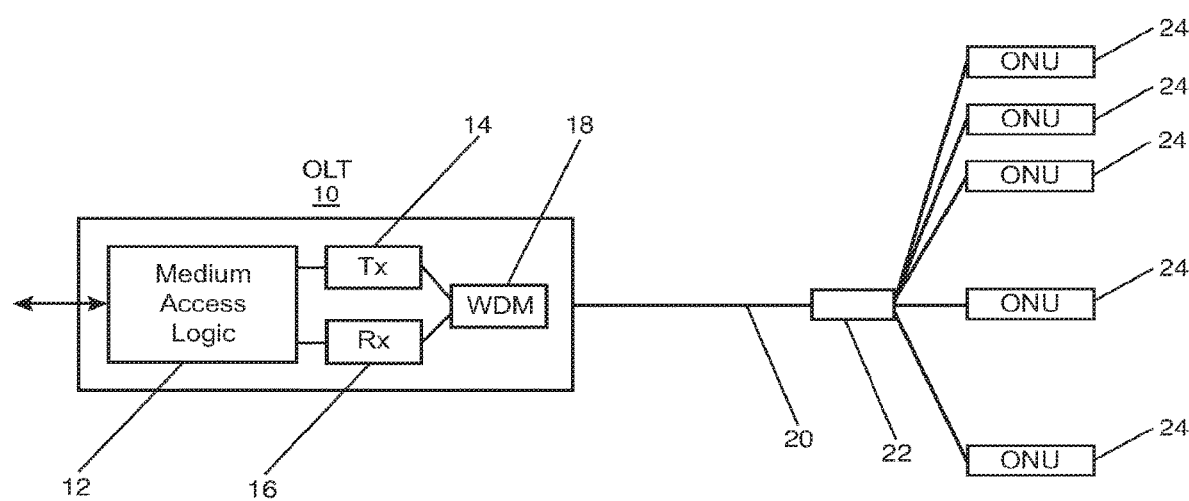
FIG. 1 is an illustration of an EPON in an optical access network consisting of an optical line terminal (OLT) at the headend side and several (i.e., N) optical network units (ONUs) at the customer premise side.
Figure 2:
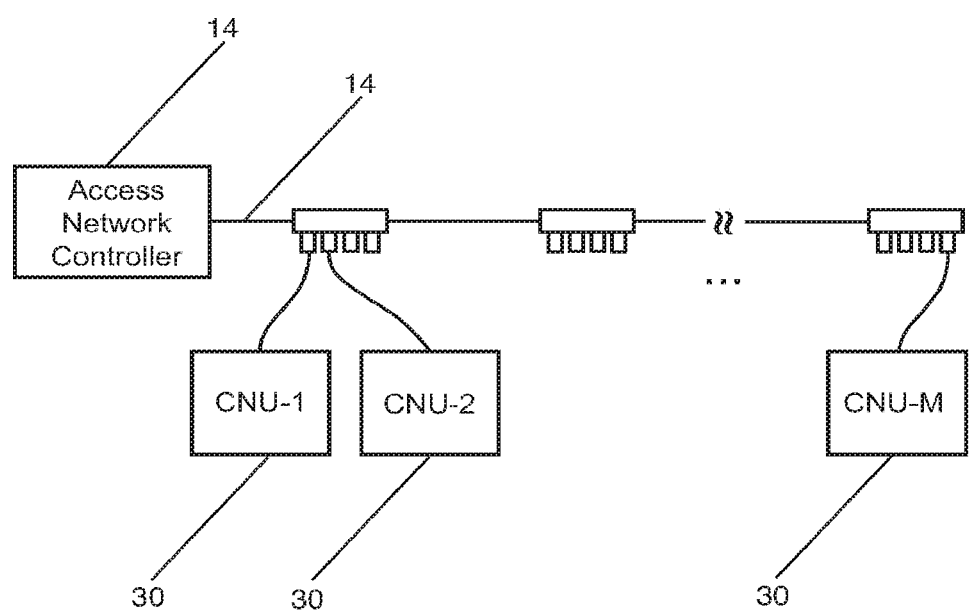
FIG. 2 illustrates a coaxial cable-based access network.
Figure 4:
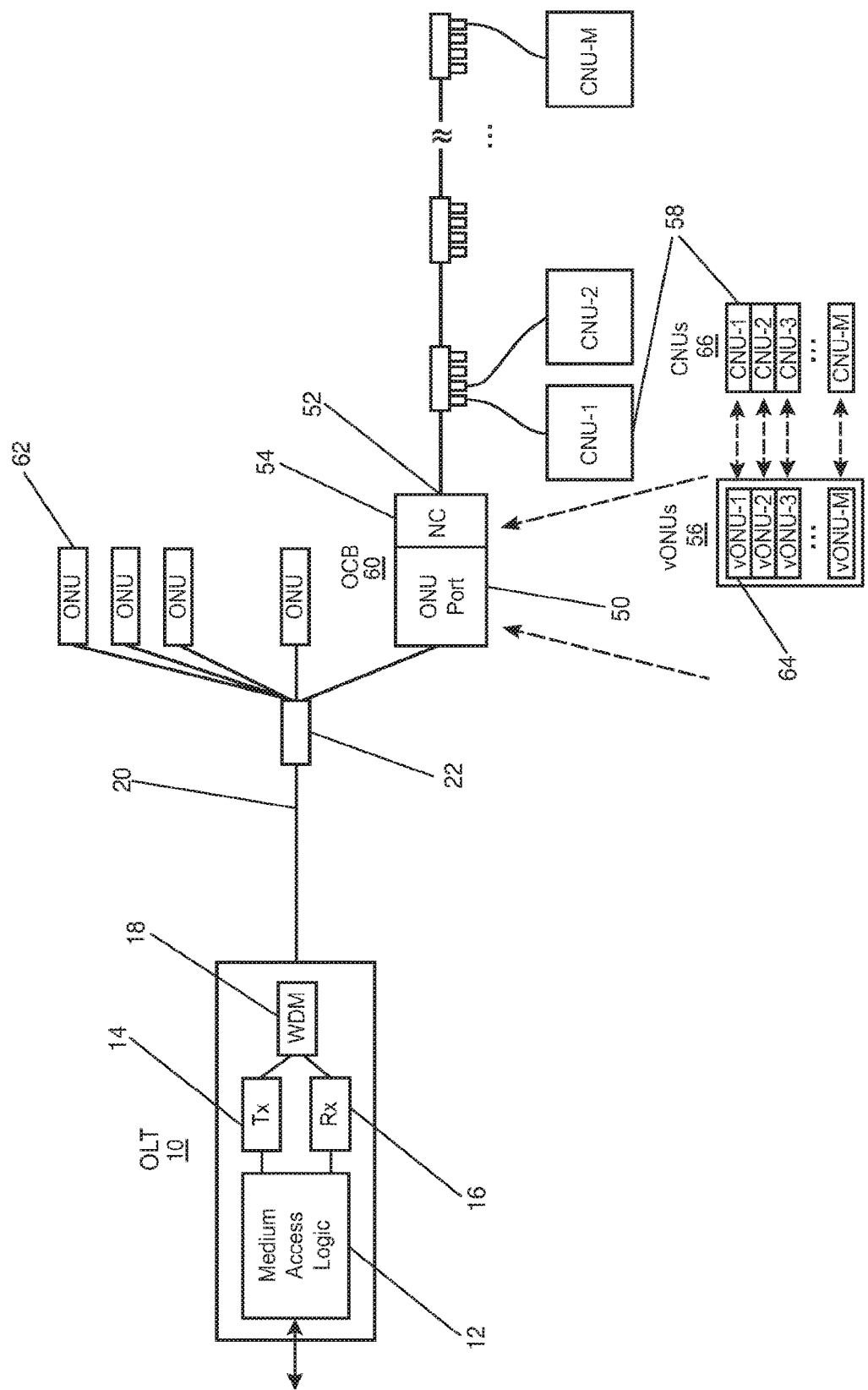
FIG. 4 is an illustration of an embodiment in which a standard EPON access network is connected to a coaxial cable access network, through an optical fiber to coax bridge (OCB: Optical-to-Coax Bridge) device.

A second embodiment of an OCB device is shown in FIG. 4. Like the embodiment of FIG. 1, this embodiment has an OLT 10 with all of the inclusions of FIG. 1. As in the previous embodiment, an optical splitter 22 provides access to each of the plurality of ONUs 62 which operate in the normal fashion. Optical splitter 22 also provides access to at least one OCB 60. In this embodiment, each OCB has an ONU port 50 and coax port 52. It is the network coordinator (NC) 54 of the coaxial cable access network, (or equivalently the CMTS of the DOCSIS network, or Access Point of the WiFi network), managing the regular operation of the coaxial cable access network, like node admission, TDD scheduling, etc. Relative to a standard OLT 10, the OCB's ONU port 50 behaves as M virtual ONUs 56, each with one or multiple LLIDs, where M is the number of CNUs 58 in the coaxial cable access network. M virtual ONUs 56 are co-located at the same physical location in the OCB 60. Each virtual ONU 64 has its own MAC address, and is uniquely mapped to a CNU for data flows.

For downstream traffic from OLT 10, OCB 60 receives and stores the packets for each virtual ONU 56 and discards packets that are not destined to any of the virtual ONUs 56 and concurrently, OCB 60 schedules and transmits downstream packets to CNUs 58, following the protocol of the coaxial cable access network, like c.LINK.

For upstream traffic from CNUs 58 to OCB 60, the OCB schedules them and receives them from CNUs 58, following the protocol of the coaxial cable access network, like c.LINK and concurrently, OCB 60 uses REPORT messages to request EPON bandwidth for individual virtual ONUs 56 and their respective LLIDs and queues to OLT 10. The OLT uses GATE messages to grant time slots for individual virtual ONUs 64 and their respective LLIDs and queues. Upon receiving GATE messages, the OCB transmit packets for appropriate ONUs (and LLIDs and queues). For EPON admission, OCB 10 will register each virtual ONU 64 separately as if it is a standard real ONU 62. Virtual ONU 64 is formed by OCB 10 when a CNU 58 is admitted into the coaxial cable access network by the OCB's NC 54 entity. For network provisioning and management, DPoE can be used directly. OLT 10 considers M virtual ONUs 56 in the OCB as if they are standard ONUs 62. For whatever operations that OLT 10 performs on each virtual ONU 56, the OCB will translate them into corresponding operations in the coaxial cable access network, and report back results when appropriate. In this respect, a virtual ONU is considered as the DPoE API of a standard ONU, and the coaxial cable network operations are considered as the actual execution of the DPoE operations inside a standard ONU device.

The introduction of ONU port 50 and virtual ONUs 56 effectively dissociates the optical fiber network segment and the coaxial cable network segment. The two networks thus operate concurrently but asynchronously. The OLT scheduler does not need to distinguish virtual ONUs 56 from standard ONUs 62. In fact, the OLT does not need to be aware that there is coaxial cable access network connected to the EPON system. There is no constraint on wire speed for any of the two network segments. The queue buffers in the OCB can be implemented in various ways depending on the number of CNUs supported, the speed, throughput, and latency of the coaxial cable access network. The OCB can do data flow control between the OLT and the CNUs by coordinating the different data flow control mechanisms between the OLT and the OCB (emulated ONU, or ONUs), and between the NC and the CNUs.

Note that with this architecture, the coaxial cable access network may be replaced by any other networks, like a c.LINK network, a new coaxial cable based network to be standardized, a WiFi network where the AP takes the place of the NC in the OCB, a DOCSIS network where the CMTS/headend replace the NC in the OCB, a HomePlug network, a HPNA network, a G.Hn network or any similar type network.

In the prior art or known systems, there are several shortcomings that have been overcome by the presently claimed invention. They include, a standard EPON OLT has no definition or awareness of a coaxial media converter (CMC), so there is an issue of doing network provisioning and management by DPoE. Additionally, framing, modulation, and forward error correction (FEC) on optical fiber needs to be different from framing on coax because of physical channel difference. 1G-EPON adopts optional frame-based FEC. When the FEC is not used in EPON, either the coax segment will suffer serious packet error rate or the CMC will need to add FEC for the coax segment, which increases the latency, and requires the CMC to first recover the packets and then add FEC. 10G-EPON uses mandatory stream-based FEC where parity symbols generated after each data block are inserted immediately after the FEC parity codeword that they are protecting, resulting in an interleaving pattern of data blocks and parity blocks. Because the coax segment typically has a lower throughput, the CMC must first do the reverse FEC, discard packets not needed, and then re-do FEC for the needed packets and silence stream. If the speed on coax is different than on fiber, and standard OLT is unaware of such a thing, there are problems because of the very low latency between the GATE message and the allocated transmission slot. The minimum time interval from the Grant message to the allocated transmit time is 1024×16 ns. This latency is easily exceeded by the CMC. Since all packets between the OLT and the CNUs pass through CMC, the OLT may need to instruct CMC how traffic between the CMC and CNUs must be coordinated, but current OLT is not aware of CMC. Ranging between the OLT and the CNU must get coordination from CMC. There is different need for power control in optical segment and the coaxial cable segment, CMC needs to get involved.

The virtual ONU concept disclosed in this filing effectively avoids all these problems, and still enables network provisioning through DPoE. Each network segment (optical and coaxial) can use the PHY and MAC mechanisms best suited for that medium.

While various embodiments of the disclosed method, apparatus, and computer program have been described above, it should be understood that they have been presented by way of example only, and should not limit the claimed invention. Embodiments of the claimed invention may be implemented in method steps, hardware, firmware, software, or any combination thereof. Embodiments of the invention may also be implemented as non-transitory computer-executable storage medium. Likewise, the various diagrams may depict an example architectural or other configuration for the disclosed method and apparatus. This is done to aid in understanding the features and functionality that can be included in the disclosed method, apparatus, and computer program. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions, and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:
1. A method of communication, the method comprising:
  in a network comprising an Ethernet passive optical network (EPON) optical line terminal (OLT), a plurality of coaxial network units (CNUs), and an optical coax bridge (OCB) comprising a plurality of virtual optical network units (vONUs) each comprising a plurality of logical link identifiers (LLIDs) and having its own MAC address, each vONU corresponding to one CNU:
  forming, in the OCB, each of the plurality of vONUs when a respective CNU is admitted to a coax network coupled to the OCB;
  communicating data transmissions between an optical fiber network and the coax network via said OCB; and
  communicating data packets between the OLT and at least one CNU.

2. The method of claim 1 wherein the OCB-performs one or more of:
  emulating an optical network unit (ONU) relative to the OLT;
  filtering out any data packets from the OLT that are not destined to any of the OCB LLIDs, and keeping and forwarding all data packets that are destined for any of the OCB LLIDs;
  controlling the coax network and managing the operation of the coax network;
  receiving the data packets by the OCB from the OLT, storing destined data packets, scheduling time-slots on the coax network, and transmitting the destined data packets to an appropriate CNU;
  receiving data packets from the at least one CNU, storing the data packets according to the corresponding LLIDs, requesting the OLT for transmission time-slots, waiting for the scheduled time-slots from the OLT, and transmitting the data packets to the OLT; and
  operating with varying portions of an RF spectrum.

3. A system for communication, the system comprising:
  an Ethernet passive optical network (EPON) optical line terminal (OLT), a plurality of coaxial network units (CNUs), and an optical coax bridge (OCB) coupled to the CNU and comprising a plurality of virtual optical network units (vONUs) each comprising a plurality of logical link identifiers (LLIDs) and having its own MAC address, each vONU corresponding to one CNU, said OCB being operable to:
    form, in the OCB, each of the plurality of vONUs when a respective CNU is admitted to a coax network coupled to the OCB;
    communicate data transmissions between an optical fiber network and the coax network; and
    communicate data packets between the OLT and at least one CNU.

4. The system of claim 3 wherein the OCB is operable to perform one or more of:
  emulating an optical network unit (ONU) relative to the OLT;
  filtering out any data packets from the OLT that are not destined to any of the OCB LLIDs, and keeping and forwarding data packets that are destined for any of the OCB LLIDs;
  controlling the coax network and managing the operation of the coax network;
  receiving all the data packets from the OLT, storing destined data packets, scheduling time-slots on the coax network and transmitting the destined data packets to an appropriate CNU; and
  receiving data packets from the at least one CNU, storing the data packets according to the corresponding LLIDs, requesting the OLT for transmission time-slots, waiting for the scheduled time-slots from the OLT, and transmitting the data packets to the OLT wherein the OCB comprises a flexible OCB for operating with varying portions of an RF spectrum.

5. A method of data communication, the method comprising:
  in a network comprising an Ethernet passive optical network (EPON) optical line terminal (OLT), a plurality of coaxial network units (CNUs), and an optical coax bridge (OCB) comprising a plurality of virtual optical network units (vONUs) each comprising a plurality of logical link identifiers (LLIDs) and having its own MAC address, each vONU corresponding to one CNU:
    forming, in the OCB, each of the plurality of vONUs when a respective CNU is admitted to a coax network coupled to the OCB;
    communicating data transmissions between an optical fiber network and the coax network via said optical coax bridge (OCB); and
    communicating data packets between the OLT and the respective CNU.

6. The method of claim 5, comprising filtering out, by the OCB, any data packets from the OLT that are not destined to any of the OCB vONUs, and keeping and forwarding data packets that are destined for any of the OCB vONUs.

7. The method of claim 5, comprising receiving data packets destined to any of the vONUs emulated by the OCB, by the OCB from the OLT, storing the received destined data packets, scheduling time-slots on the coax network and transmitting the data packets to an appropriate CNU.

8. The method of claim 5, comprising receiving data packets from at least one CNU by the OCB that are destined to the OLT, storing the data packets according to the corresponding vONUs and its associated LLIDs, requesting the OLT for transmission time-slots, waiting for the scheduled time-slots from the OLT and transmitting the data packets to the OLT.

9. The method of claim 5, wherein the OCB comprises a flexible OCB for operating with varying portions of an RF spectrum.

10. A system for data communication, the system comprising
  an Ethernet passive optical network (EPON) optical line terminal (OLT), a plurality of coaxial network units (CNUs), and an optical coax bridge (OCB) comprising a plurality of virtual optical network units (vONUs) each comprising a plurality of logical link identifiers (LLIDs) and having its own MAC address, each vONU corresponding to one CNU, the OCB being operable to:
    form, in the OCB, each of the plurality of vONUs when a respective CNU is admitted to a coax network coupled to the OCB;
    communicate data transmissions between an optical fiber network and the coax network via an optical coax bridge (OCB); and
    communicate data packets between the OLT and at least one CNU.

11. The system of claim 10, wherein the system comprises one or both of:
  a filter for filtering out any data packets from the OLT that are not destined to any of the OCB vONUs, and keeping and forwarding data packets that are destined for any of the OCB vONUs; and
  a controller for controlling the coax network and managing the operation of the coax network by the OCB, the OCB being operable to:
    receive the data packets destined to any of the vONUs emulated by the OCB from the OLT;

store the received destined data packets;
schedule time-slots on the coax network;
transmit the data packets to an appropriate CNU;
receive data packets from the at least one CNU that are destined to the OLT;
store the data packets according to the corresponding vONUs and its associated LLIDs;
request the OLT for transmission time-slots; and
wait for the scheduled time-slots from the OLT and transmit the data packets to the OLT.

12. A method of data communication, the method comprising:
in a network comprising an Ethernet passive optical network (EPON) optical line terminal (OLT), at least one second network, and an optical coax bridge (OCB) comprising a plurality of virtual optical network units (vONUs) each comprising a plurality of logical link identifiers (LLIDs) and having its own MAC address, each vONU corresponding to one coaxial network unit (CNU):
forming, in the OCB, each of the plurality of vONUs when a respective CNU is admitted to a second access medium network coupled to the OCB;
communicating data transmissions between the first access network comprising an optical fiber network and the second access medium network via said OCB; and
communicating data packets between the OLT and the network unit of the second access medium network.

13. The method of claim 12 wherein the second access network comprises a member from the group consisting of a c.LINK network, a standardized coaxial cable based network, a WiFi network, a DOCSIS network, a HomePlug network, a HPNA network, and a G.Hn network.

14. The method of claim 12, comprising controlling, by the OCB, a coax network and managing the operation of the coax network.

15. The method of claim 12, comprising receiving all data packets destined to any of the vONUs emulated by the OCB, by the OCB from the OLT, storing the received destined data packets, scheduling time-slots on a coax network and transmitting the data packets to an appropriate CNU.

16. The method of claim 12, comprising receiving data packets from at least one CNU by the OCB that are destined to the OLT, storing the data packets according to the corresponding vONUs and its associated LLIDs, requesting the OLT for transmission time-slots, waiting for the scheduled time-slots from the OLT and transmitting the data packets to the OLT.

17. The method of claim 12, wherein the OCB comprises a flexible OCB for operating with varying portions of an RF spectrum.

* * * * *